3,252,189
LINE TENSIONING APPARATUS
Walther Lenau Kanneworff, Malmo, and Per Olov Trostad, Viggbyholm, Sweden, assignors to Seasafe Transport AB, Stockholm, Sweden
Filed Sept. 21, 1964, Ser. No. 397,949
Claims priority, application Sweden, Oct. 4, 1963, 10,915/63
4 Claims. (Cl. 24—71.3)

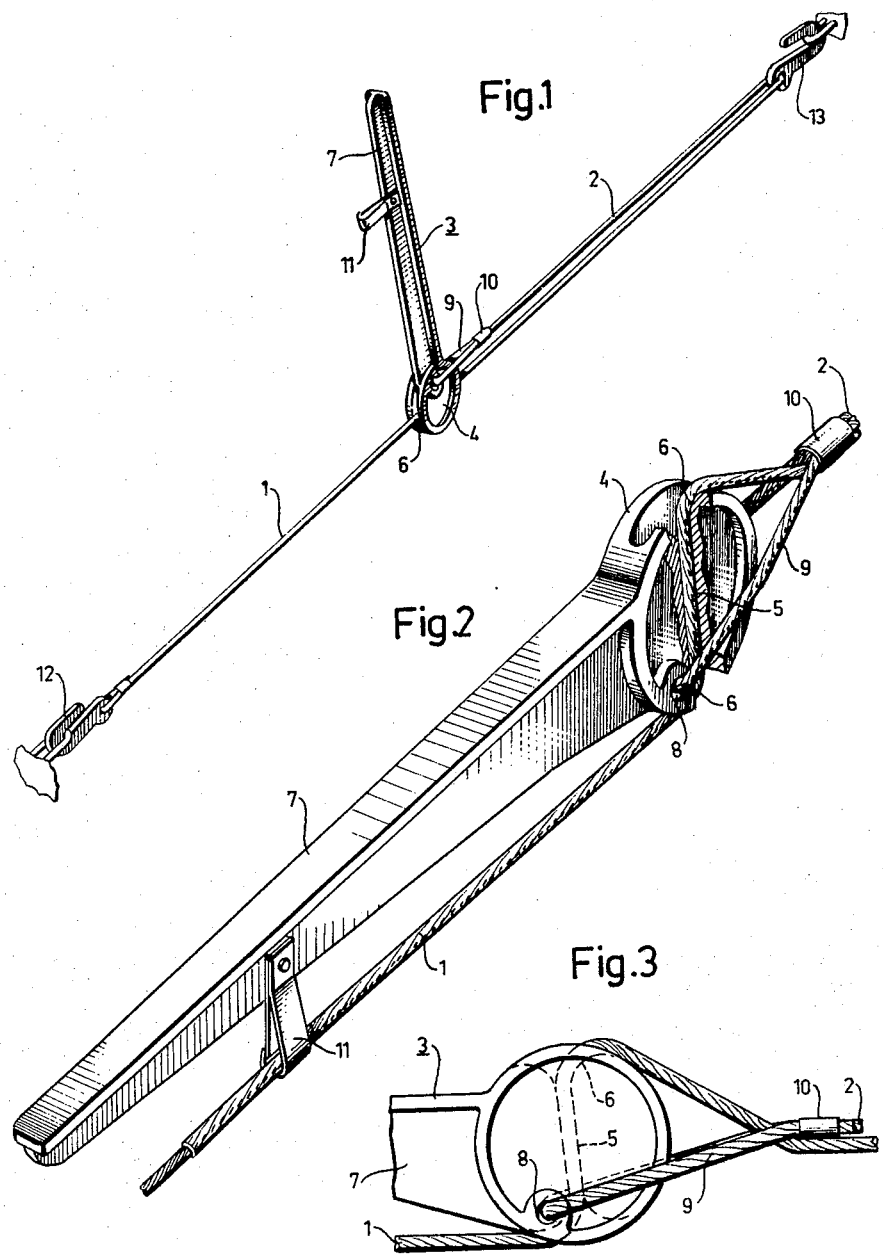

The present invention relates to a line tensioner. The term "line" as used herein includes wire or fiber rope, chain, cable, wire and similar elongated flexible lines. Such line tensioners have a wide usage. They can, for example, be used as lashing tackle for cars or other vehicles being transported by ship or other forms of transport. They can also be used to tension stay wires to masts, e.g., aerial masts, particularly transportable masts. They have further been found suitable for the lashing together of timber, pipes, etc.

Line tensioning tackle is generally arranged in such a way that it has some particular means for pre-tensioning the line and a further means for extra-tensioning which gives the final required tension to the line.

This invention refers to a particularly suitable means of extra-tensioning which, in accordance with an embodiment of the invention, makes it possible for one and the same means to be used for the pre-tensioning as well as for the extra-tensioning. The invention thus relates to a line tensioner which operates by bending or folding the line and is mainly characterized in that the tensioning member includes a lever arm, one end of which cooperates with the line, and is equipped with a free running guide arrangement for the line; which arrangement, during the tensioning, maintains the part of the line passing through the guide arrangement so positioned that this part of the line forms an angle with the main axis of the lever arm, preferably an angle of approximately 90°. The end parts of the guide arrangement are advantageously curved in the direction of the line in order to follow the bent parts of line when the lever arm is moved to extra-tensioning position approximately parallel with the main direction of the line. It is also suitable if the profile of the guide arrangement, perpendicular to the line passing therethrough, closely follows the profile of the line, at least at the ends of the guide arrangement.

According to another advantageous improvement of this invention, the end of the lever arm, cooperating with the line during the tensioning, is formed, at least partly, as a rotational body with a relatively large radius, suitably as a circular disc of a predetermined thickness which is parallel with the tensioning plane, whereby the guide arrangement for the line is formed by a channel of suitable circular section passing diametrically through said body. It is preferable to provide the end of the lever arm opposite to the guide arrangement of the line with a hook intended, after the possible pretensioning of the line upon the turning of the lever arm and the extra tensioning of the line caused thereby, to engage and hook the lever arm to the line.

The line tensioner is also, as stated, particularly suitable for use when the line is first given a certain pre-tension and thereafter, by means of the tensioning means is given the final tension required. A particularly suitable embodiment according to the invention, for this purpose, is provided in that the one end of the line is passed from its securing means, e.g., a securing hook, in which the line is free to move, back to the line tensioner and is secured at the lever arm in the vicinity of the above mentioned guide arrangement or the channel for the line, suitably in a hole going through the rotational body perpendicularly to the tensioning plane, so that said part of the line forms a loop embracing the rotation body. Guide tracks for the tensioned line part in the tensioning plane are preferably arranged on the rotational body in such a way that the line part follows said tracks during the securing process, whereby the part on the one side of the rotational body is pressed against said loop embracing the body, the size of which is accordingly adapted to make the loop tightly embrace said body.

By this construction there is gained that a tensioned line which, for example, is equipped with a securing hook at one end which can be secured to a mounting, e.g., the deck of a ship, and which is passed through the channel of the rotational body and at its opposite end through the eye of a hook, intended for the attachment, e.g., to a vehicle, and then is secured in the hole of the rotational body perpendicularly to the tensioning plane by means of above described line loop, first can be pre-tensioned by moving the rotational body with the channel slipping along the line, until the line has obtained a certain intended pre-tension. Thereafter the extra-tensioning is effected by turning the lever arm partly around the center point of the channel and partly around the hole passing through the rotational body perpendicularly to the tensioning plane. By doing so an extra-tensioning is effected to the parts of the line on either side of the securing hook attached, for example, on the vehicle, so that no sliding of the line through the hook can take place. The lever arm is thereafter hooked to the part of the line nearest to the hook fixed to the mounting.

By choosing the diameter of the rotational body and thereby the length of the tensioning channel in accordance with its specific purpose the line tensioner according to the invention may be adapted to most tensioning requirements.

The hook for the attachment of the lever arm to the line is formed with a part opening toward the line so as to allow the easy insertion and removal of the line into and out of the hook, respectively, and is provided with a locking spring in the same way as a spring safety hook.

The invention will be described more in detail in connection with the attached drawings which show an embodiment of the invention intended for the making fast of a mobile object, such as a car, a railway truck or the like, to a mounting, such as the deck of a ship.

In the drawing:
FIG. 1 shows a line tensioning tackle in perspective tensioned between two hooks and viewed obliquely from one side during the pre-tensioning;
FIG. 2 shows the line tensioning tackle also in perspective and viewed obliquely from one side with the lever arm being in a position which imparts the required extra-tension to the line; and
FIG. 3 shows a diagrammatical detail view of the line tensioning tackle shown in FIG. 2.

As is evident from the drawing, one end of the line, the part which is designated with numeral 1, is secured to a hook 12, being secured to a gutter ring or similar means, which is secured to the deck of a ship, while the other part 2 of the line, after having passed through a channel 5 which forms a free running guide arrangement for the line in the tensioning means 3 including a lever arm 7, is freely passed through the eye of another hook 13 which fastened to another gutter ring which in turn is fastened to the chassis of the mobile object, e.g., a car or railway truck which is intended to be secured by means of the tensioning tackle. The part 2 of the line is completed by a loop 9 which is passed through a hole 8 in the tensioning means 3 in the vicinity of the channel 5.

In the embodiment shown the tensioning means 3 includes lever arm 7, and end 4 of which is shaped as a rotational body. The rotational body is a disc of such a thickness that the channel 5 for the line may be provided diametrically through the disc. The diameter of the disc, that is the distance between the ends 6 of the channel, is so adapted that the required extra-tensioning of the line 1, 2 may be obtained. The diameter of the channel is so chosen that it is large enough to allow the line to slide unhindered through the channel even if it has become somewhat distorted because of bends or the like being formed on it. The ends 6 of the guide or the channel are rounded in the direction of the line so that they accommodate the curved portions of the line as shown in FIGURES 2 and 3. The direction of the channel is preferably chosen so that the axis of the lever arm 7 forms an angle, somewhat larger than 90°, with the part 1 of line, before the extra-tensioning function is performed, i.e., when the lever arm is in a position shown in FIGURE 1.

In the position which the tensioning means 3 assumes when the extra-tensioning has been carried out, see FIGURE 2, the direction of the channel 5 and of the line part guided by it forms an angle, which is less than 90° to the line part 1. This has the advantage that a good locking of the line at the ends 6 of the channel is obtained.

The securing hole 8 in the rotational body 4 is located in such a way that when the tensioning means is in its locked position it comes to lie under the longitudinal axis of the lever arm 7. Thus during the tensioning function the loop 9 passes through an unstable position, just when the tension direction of the loop coincides with the center point of the rotational body. After this position has been passed, however, a tension direction is obtained of the loop 9, which lies under said center point, i.e., to a certain degree a self locking of the tensioning means is obtained.

The tensioning means according to the invention can be used with any line such as a rope, wire or chain but comes into its own when used together with steel wire rope, particularly if the steel wire rope is covered with nylon or the like. In this form the line tensioner according to the invention is particularly suited for use as lashing equipment for lacquered vehicles. If a nylon covered wire rope is used having a diameter between 6 and 7 millimeters the diameter of the guide channel in the disc of the tensioning means is 8 to 9 millimeters. Such a nylon covered rope has a manufacture tolerance to ±0.2 millimeters and the arrangement according to the invention is not sensitive to such variation or variations which appear due to damage to the wire. An essential advantage is that such nylon covered wire is not damaged by the tensioning means.

The arrangement according to the invention operates in the following manner:

By moving the tensioning means 3 along the line 1 the length of line required to hook fast the hooks 12 and 13 to the deck gutter rings and an eye or a gutter ring respectively on a vehicle is first obtained. Thereafter the line is pre-tensioned by allowing the disc 4 with its channel 5 to slide over the line 1, while the line part 2 is allowed to slide simultaneously through the eye in the hook 13. When the line has been sufficiently tensioned the lever arm 7 is moved downwards towards the line part 1, whereby the line curves around the ends 6 of the channel 5, thereby shortening both parts of the line part 2, i.e., the part to the right of the hook 13 in FIGURE 1 and the part to the left of said hook 13, with both parts being shortened approximately equally. During this extra-tensioning action the line loop does not thus need to slide in said hook eye, which is a great advantage. The lever arm 7 is then moved down to the position as shown in FIGURE 2, so that the longitudinal axis comes to lie parallel with the line part 1, and hook 11 on the lever arm 7 hooks fast the line part 1. The line has now been extra-tensioned and the movable object is secured fast to the deck of the ship. As is apparent from FIGURE 2 the size of the loop 9 is adapted in such a way that it forces down the lower part of the line part 2 against the disc 4.

A further advantage of the arrangement of this fastening loop for line part 2 is attained by the fact that this part may be secured in the same plane as the other part to the lever arm 7 so that any oblique positioning of the lever arm 7 by forces acting outside the tensioning plane may not be feared.

Suitably the hook 11 is so shaped that its center plane, which is parallel with the center plane of the lever arm 7, lies outside the latter's center plane and the hook is provided with an opening which is directed obliquely toward the center plane of the lever arm so that the opening extends approximately flush therewith. Thereby it is easy to pass the line out of or into the hook as the line has itself the ability to slide into and out of the hook when the spring lock therefor is depressed. The section of the lever arm is preferably T-shaped.

In conclusion the advantages of the invention may be summarized in the following ways:

The end of the tensioning means, cooperating with the line, is provided with a guide which partly can be used so that the tension means may slide along the line in order to effect the pre-tensioning thereof and partly can be used as a locking means by being passed to a position which is approximately at 90° to the main direction of the line.

Extra tensioning of the line is carried out through the turning of the tension means, partly around the center point of the guide arrangement and partly around a securing hole of the free running line part. Thereby a simple construction of the tensioning means is attained and moreover the running line part does not need to slide in the relation to its securing hook.

The tensioning means is provided with one lever only and one part of the line is instead used as a second "locking lever" wherein the tensioning lever is hooked.

The anchoring of the running part of the line in the tensioning means with the help of a line loop ensures that all tensioning forces act in one and the same tensioning plane so that the tensioning means deos not present any tendency to capsize. The other part of the running line is also guided through the eye.

A certain self-locking of the tensioning means is produced by the appropriate placing of the anchoring of the line loop.

The invention has been described in connection with an embodiment shown on the drawing, but it is obvious that many alterations or modifications may be made within the scope of the attached claims.

What we claim is:

1. A line tensioning apparatus for pretensioning and extra-tensioning a line, the line being fixed at one end to a mounting and extending through the apparatus, the line after passing through the apparatus extending through another mounting and doubled back and fixed at the other end of the line to the apparatus, the line tensioning apparatus comprising:

(a) a tensioning member including a disc shaped rotational body, (b) a channel extending diametrically through the disc shaped rotational body, the channel having a diameter larger than the line and providing a free running guide for the line, (c) a lever arm integral with the tensioning member and extending outwardly from the disc shaped rotational body at an angle of approximately 90° to the channel, (d) a securing hole extending through the disc shaped body, the hole being adjacent the end of the channel which normally faces the end of the line fixed to the mounting before extra-tensioning, so that upon rotation of the lever arm for extra-tensioning toward the end of the line fixed to the mounting through approximately 90° the end of the line fixed to the securing hole is below the center line of the tension force and the other end of the channel is above the center line of the tension force and both double back portions of the line are shortened equally during the extra-tensioning operation, and (e) means for hooking the lever arm to the end of the line fixed to the mounting.

2. A line tensioning apparatus as in claim 1 wherein the means for hooking the lever arm to the end of the line fixed to the mounting is a snap hook extending outwardly from the lever arm and fixed thereto.

3. A line tensioning apparatus as defined in claim 1 wherein the ends of the channel are curved and have a diameter equal to the diameter of the line.

4. A line tensioning apparatus as defined in claim 1 wherein the angle between the lever arm and the channel, from the end of the channel normally facing toward the end of the line fixed to the mounting is somewaht greater than 90°, and the securing hole is slightly above the channel.

References Cited by the Examiner
UNITED STATES PATENTS

| | | | |
|---|---|---|---|
| 1,215,391 | 2/1917 | Lofquist | 24—71.3 |
| 1,586,174 | 5/1926 | Bell | 24—71.3 |

FOREIGN PATENTS 139,731  12/1934  Austria.

EDWARD C. ALLEN, Primary Examiner.

MILTON S. MEHR, Examiner.